(12) United States Patent
Donohue

(10) Patent No.: US 7,701,329 B2
(45) Date of Patent: Apr. 20, 2010

(54) ROOM MONITOR FOR CRITICAL ENVIRONMENT ROOMS

(76) Inventor: Kieran L. Donohue, 8387 N. Indian Creek Pkwy, Fox Point, WI (US) 53217

( * ) Notice: Subject to any disclaimer, the term of this patent is extended or adjusted under 35 U.S.C. 154(b) by 445 days.

(21) Appl. No.: 11/451,266

(22) Filed: Jun. 12, 2006

(65) Prior Publication Data
US 2007/0008064 A1    Jan. 11, 2007

Related U.S. Application Data

(60) Provisional application No. 60/690,029, filed on Jun. 13, 2005.

(51) Int. Cl.
G08B 25/00    (2006.01)
(52) U.S. Cl. .................. 340/525; 340/520; 340/506
(58) Field of Classification Search .............. 340/500, 340/505, 506, 517, 520, 521, 815.4, 815.65, 340/525; 62/132, 126; 700/83; 715/732; 454/61, 67
See application file for complete search history.

(56) References Cited

U.S. PATENT DOCUMENTS

| | | | |
|---|---|---|---|
| 5,810,657 A * | 9/1998 | Pariseau | 454/61 |
| 5,951,394 A * | 9/1999 | Pariseau | 454/61 |
| 6,647,735 B2 * | 11/2003 | Street et al. | 62/132 |
| 6,967,565 B2 * | 11/2005 | Lingemann | 340/310.11 |
| 7,047,092 B2 * | 5/2006 | Wimsatt | 700/83 |
| 7,049,951 B2 * | 5/2006 | Rhodes et al. | 340/500 |
| 2007/0162858 A1 * | 7/2007 | Hurley et al. | 715/732 |

* cited by examiner

*Primary Examiner*—Van T. Trieu
(74) *Attorney, Agent, or Firm*—Donald J. Ersler

(57) ABSTRACT

A room monitor having a second display includes a controller, a first display and a second display. The first display is preferably a touch screen monitor, which allows the entry of data into the controller without the need for a keyboard. However, the controller may be programmed through a keyboard. The controller includes a plurality of inputs and outputs for monitoring and/or controlling such room environmental factors as pressure, temperature, humidity and lighting. The inputs are used to read sensors. The outputs are used to actuate control devices. The first display includes a plurality of menus for controlling at least one environmental factor. The second display shows information the condition of a critical environment room. There is at least one message displayed on the second display. A second embodiment of the room monitor includes a controller and the first display. The first display must be a touch screen monitor.

14 Claims, 5 Drawing Sheets

ROOM MONITOR FOR CRITICAL ENVIRONMENT ROOMS

CROSS-REFERENCE TO RELATED APPLICATIONS

This is a utility patent application taking priority from provisional application No. 60/690,029 filed on Jun. 13, 2005.

BACKGROUND OF THE INVENTION

1. Field of the Invention

The present invention relates generally to monitoring of critical environment rooms and more specifically to a room monitor for critical environment rooms having a second display for disclosing the condition in a room.

2. Discussion of the Prior Art

The prior art discloses monitoring of room environmental factors, such as humidity, pressure, temperature and lighting in a room. The monitoring is done with a controller and a display. The controller has multiple inputs for the connection of sensors and multiple outputs for the connection to control devices. The controller will also provide alarms, when the room environmental factors exceed the limits of a range. The information from the inputs and outputs may be displayed on a screen. Information for configuring sensors and control devices and setting limits is entered through a keyboard, which is connected to the controller. The prior art does not disclose the use of a second display, which displays who may enter a critical environment room or if it is safe to enter the critical environment room. Further, it appears the prior art does not disclose the use of touch screen monitors for the entry of limits concerning room environmental factors of a critical environment room.

Accordingly, there is a clearly felt need in the art for a room monitor for critical environment rooms, which provides a second display for disclosing the condition of a critical environment room and utilizes a touch screen display for the entry of data.

SUMMARY OF THE INVENTION

The present invention provides a room monitor for critical environment rooms, which preferably includes a touch screen monitor for entering data into a controller. The room monitor for critical environment rooms (room monitor) preferably includes a controller, a first display and a second display. For the purpose of this patent application, the definition of a room includes an enclosure or defined space. The first display is preferably a touch screen monitor, which allows the entry of data into the controller without the need for a keyboard or keypad. However, the controller may be programmed through a keyboard or keypad. The controller includes a plurality of inputs and outputs for monitoring and/or controlling such room environmental factors as pressure, temperature, humidity, lighting, filtering, air quality, air composition or the like. The inputs are used to read various sensors. The outputs are used to actuate control devices for changing various functions in HVAC (heating ventilation air conditioning) system or the like. The controller includes a software program to keep pressure, temperature, humidity and lighting within preprogrammed limits through the inputs and outputs. If the limits are exceeded an alarm will be activated.

The first display is used to show the current mode of a room, such as positive isolation, negative isolation or no isolation. The first display also includes access through the software program to a plurality of menus, which allow temperature, humidity, pressure and lighting settings to be made in the controller. The second display shows information provided by the controller concerning the condition of a critical environment room, such as an isolation room, surgical suite, neonatal suite, laboratory, clean room, vivarium room or the like. There is at least one message displayed on the second display. The at least one message pertains to the condition of the critical environment room. For example, the at least one message could be, "DO NOT ENTER INFECTIOUS ROOM."

A second embodiment of the room monitor includes a controller and a touch screen monitor. The touch screen monitor allows the entry of data into the controller without the need for a keyboard or keypad. A second display may be utilized. The touch screen monitor is less obvious for unauthorized personnel to meddle with or to sabotage the room monitor than a keyboard. Unauthorized personnel must know that the system may be modified through the touch screen. A keyboard or keypad is an open invitation for someone to meddle with or sabotage the room monitor.

Accordingly, it is an object of the present invention to provide a room monitor for critical environment rooms, which includes a second display for disclosing the condition of a critical environment room.

Finally, it is another object of the present invention to provide a room monitor, which includes a touch screen monitor for entering data into a controller without the need for a keyboard or keypad.

These and additional objects, advantages, features and benefits of the present invention will become apparent from the following specification.

DETAILED DESCRIPTION OF THE PREFERRED EMBODIMENTS

Figure 1:
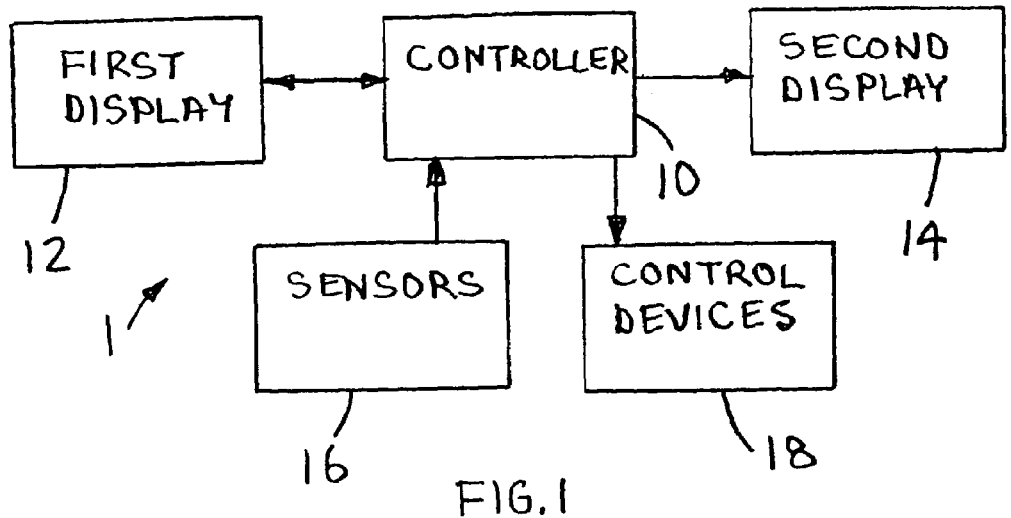
FIG. 1 is a block diagram of a room monitor in accordance with the present invention.

With reference now to the drawings, and particularly to FIG. 1, there is shown a room monitor 1. The room monitor 1 includes a controller 10, a first display 12 and a second display 14. The controller 10 is preferably any suitable microprocessor or microcontroller based controller. The first display 12 is preferably a touch screen monitor, which allows the entry of data into the controller 10 or programming of the controller 10 without the need for a keyboard or keypad. However, data may be entered into the controller 10 or the controller 10 programmed through a keyboard or keypad.

The controller 10 includes at least one input and at least one output for monitoring and/or controlling such room environmental factors as pressure, temperature, humidity, lighting, filtering, air quality, air composition or the like. The at least one input is used to read at least one sensor 16, which measures at least one of the room environmental factors of pressure, temperature, humidity, lighting, filtering, air quality, air composition and the like. The at least one output is used to actuate at least one control devices 18 for changing at least one of the room environmental factors of pressure, temperature, humidity, lighting filtering, air quality, air composition and the like. The controller 10 further includes a software program for entering limits for controlling pressure, temperature, humidity, lighting, filtering, air quality and air composition and the like. The software program reads voltage from the at least one sensor 16 through the at least one input port and sends out signals through the at least one output port to actuate the at least one control device 18, when a parameter exceeds a preset limit.

Figure 2:
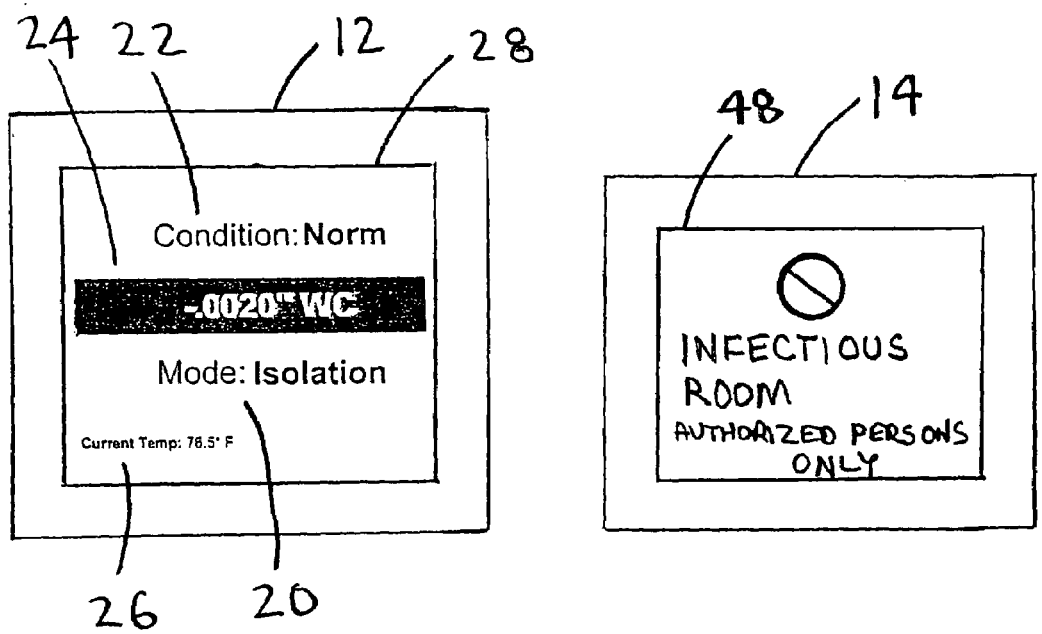
FIG. 2 is a front view of a first display adjacent a second display of a room monitor in accordance with the present invention.
Figure 3:
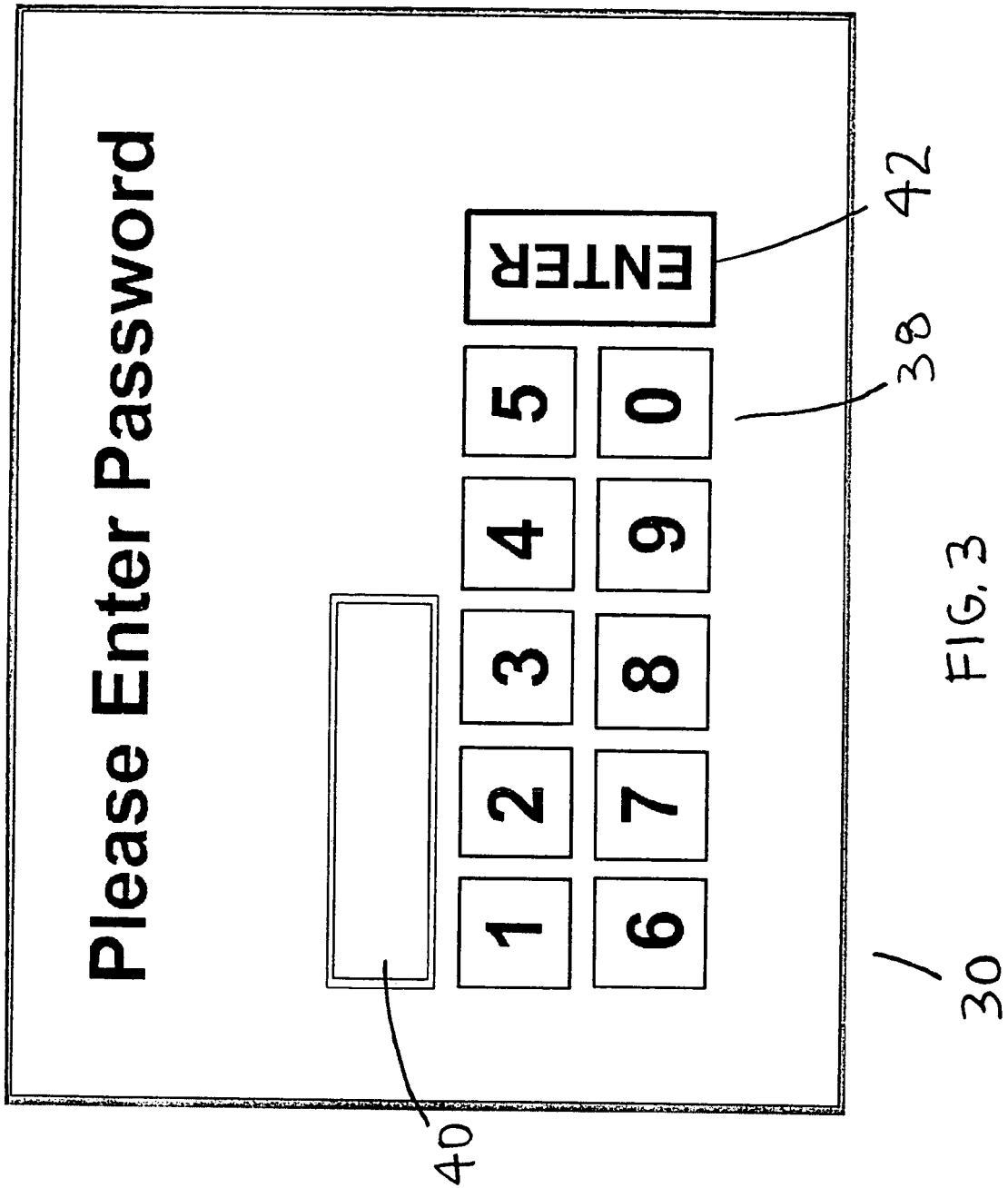
FIG. 3 is a front view of a password entry screen of a room monitor in accordance with the present invention.
Figure 4:
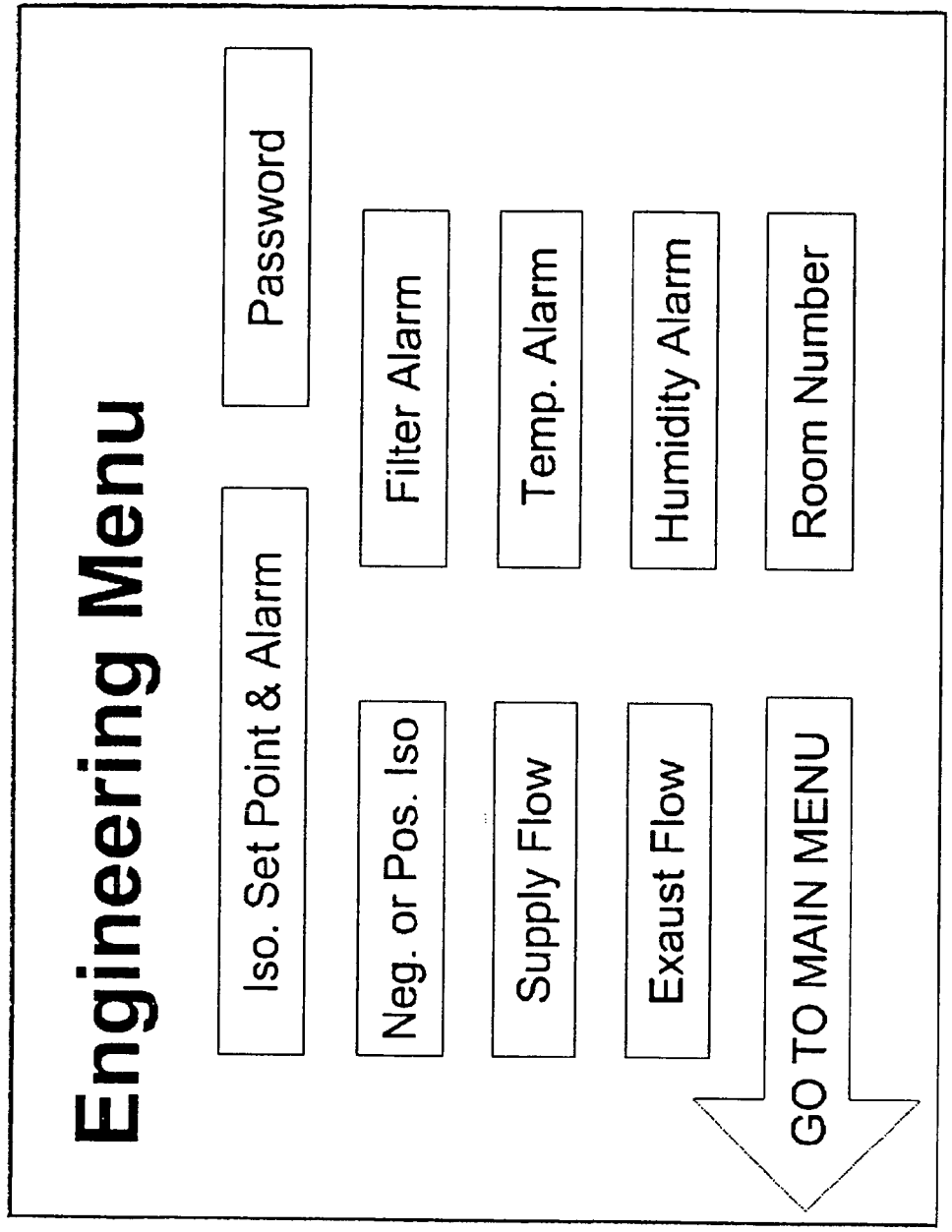
FIG. 4 is a front view of an engineering menu of a room monitor in accordance with the present invention.
Figure 5:
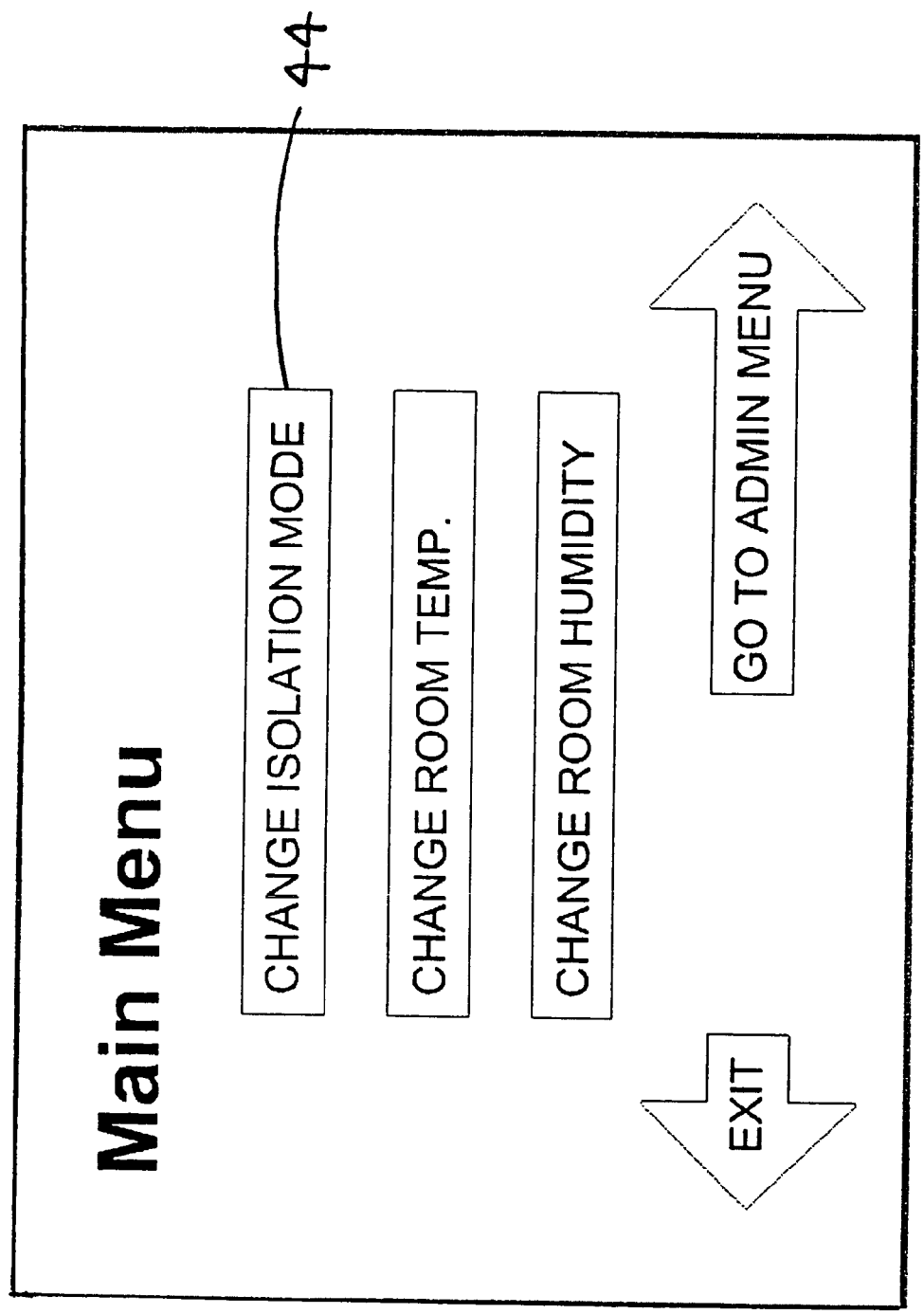
FIG. 5 is a front view of a main menu of a room monitor in accordance with the present invention.
Figure 6:
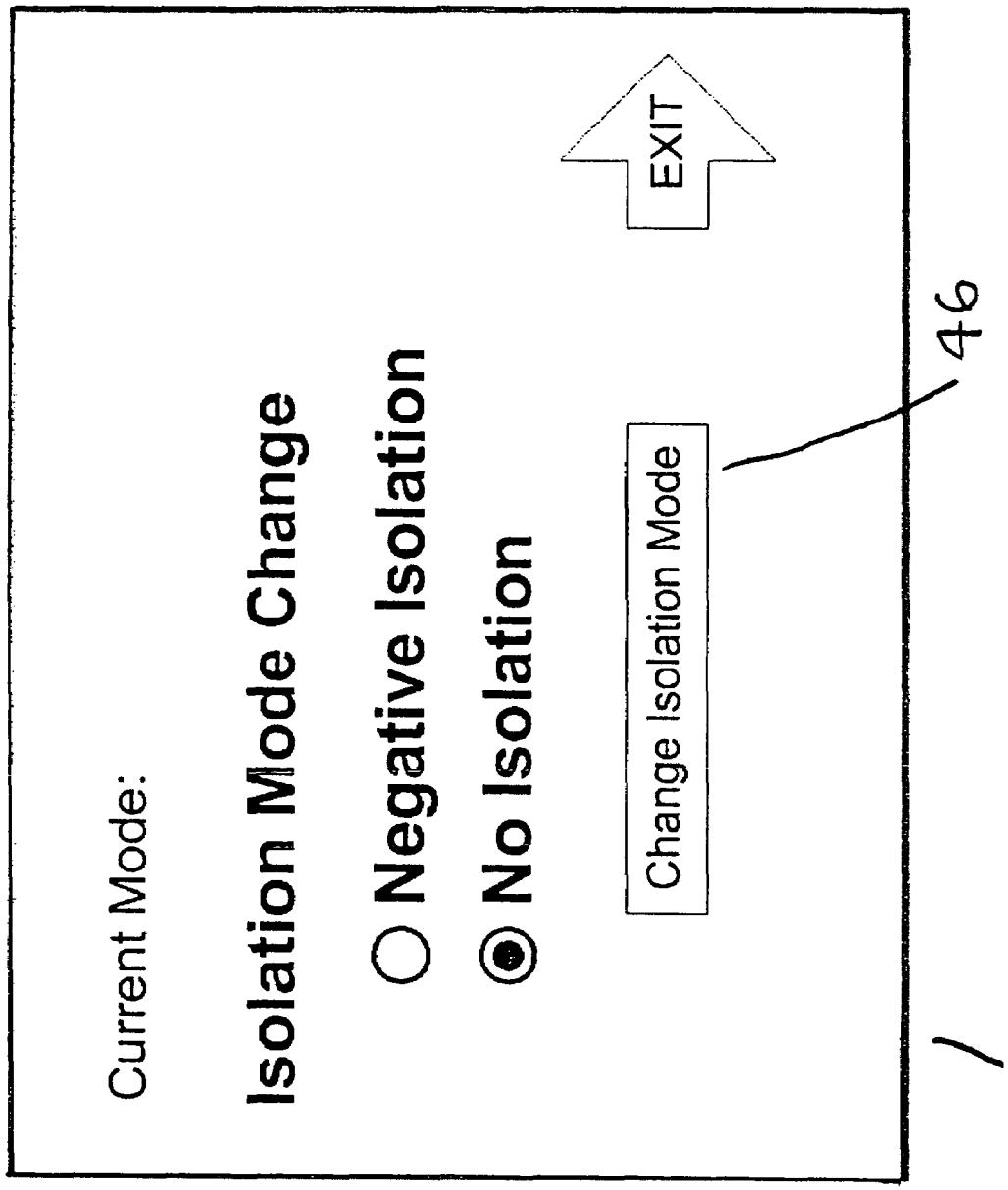
FIG. 6 is a front view of an change isolation mode screen of a room monitor in accordance with the present invention.

With reference to FIG. 2, the software program is preferably used to show the mode 20, condition 22, pressure 24 and temperature 26 on the first display 12. The mode 20 could be positive isolation, negative isolation or no-isolation, but could be any other appropriate description. The condition 22 is being displayed as normal, but could be any other appropriate description, such as "Emergency." The pressure 24 is displayed as a function of positive or negative water columns. The temperature 26 is displayed as current temperature in either Fahrenheit or Celsius.

With reference to FIGS. 3-6, a plurality of interactive menus are accessible by physically touching a first screen 28 of the first display 12 with at least one finger. The plurality of interactive menus include a password menu 30, an engineering menu 32, a main menu 34 and an isolation mode change menu 36. Access to change settings through the interactive menus is preferably protected through the password menu 30. To access the interactive menus, a user enters a password by touching numeric buttons 38. The numeric buttons 38 that are touched appear in the password window 40. When all the numbers are entered, the enter button 42 is touched and the software program preferably displays the engineering menu 32.

The engineering menu 32 allows alarms to be set for filters, temperature, humidity and isolation for a particular room. The engineering menu 32 also allows supply flow and exhaust flow rates to be set in the HVAC system. The main menu 34 allows isolation mode, temperature and humidity to be changed by touching a button. Contacting the isolation mode button 44 provides the isolation mode change menu 36. Touching the change isolation mode button 46 changes the no isolation mode to positive isolation or negative isolation. The second display 14 shows information provided by the controller 10 concerning the condition of a critical environment room, such as a isolation room, surgical suite, neonatal suite, laboratory, clean room, vivarium room or the like.

The second display 14 is preferably an LCD monitor, but other monitors, such as CRT monitors may also be used. There is at least one message displayed on a second screen 48 of the second display 14. The at least one message pertains to the condition of the critical environment room. For example, the at least one message could be, "DO NOT ENTER INFECTIOUS ROOM." In fact, there could be three messages for an isolation room, "DO NOT ENTER, INFECTIOUS ROOM, AUTHORIZED PERSONNEL ONLY," "DO NOT ENTER, ROOM BEING CLEARED" and "ROOM CLEARED."

The messages could be accompanied with any appropriate graphics, such as a canceled circle or a caution symbol. A background of the message could be colored to further reinforce the message or be associated therewith. The background of the "do not enter, infectious room, authorized personnel only" message would be red. The background of the "do not enter, room being cleared" message would be yellow. The background of the "room cleared" message would be green. The time for displaying the "do not enter, room being cleared" message may be set through the engineering menu 32.

A second embodiment of the room monitor includes the controller 10 and the first display 12. The first display 12 must be a touch screen monitor. The second embodiment of the room monitor would not require the second display 14. The touch screen monitor is less obvious for unauthorized personnel to meddle with or sabotage the room monitor than a keyboard or keypad. Unauthorized personnel must know that the system may be modified through the touch screen. A keyboard or keypad is an open invitation for someone to meddle with or sabotage the controller 10.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A room monitor comprising:
   a controller having at least one input and at least one output, said controller having the functions of monitoring and controlling at least one room environmental factor of pressure inside a room;
   a first display being connected to said controller, said first display providing information for the at least one room environmental factor of pressure inside a room;
   at least one second display being connected to said controller, said at least one second display providing at least one message concerning the condition of the room being one of infectious room, room being cleared and room cleared; and
   entering a command into said controller through said first display to change the pressure inside the room, results of said command being reflected on said at least one second display through a message concerning the condition of the room, said at least one display being located adjacent said first display.

2. The room monitor of claim 1 wherein:
   said at least one input being connected to at least one sensor.

3. The room monitor of claim 1 wherein:
   said at least one output being connected to at least one control device for actuation thereof, said at least one control device changing the at least one room environmental factor.

4. The room monitor of claim 1 wherein:
   said first display providing status on a mode of isolation, said mode being one of positive isolation, negative isolation or no isolation.

5. The room monitor of claim 1 wherein:
   said first display being a touch screen monitor, said first display providing access to said controller.

6. The room monitor of claim 1, further comprising:
   one of a keyboard and a keypad, one of said keyboard and keypad providing access to said controller.

7. The room monitor of claim 1 wherein:
   at least one of said at least one message on said second display being active for a programmable period of time.

8. The room monitor of claim 1 wherein:
   said controller being accessed to set limits for the at least one room environmental factor, if one of the limits is exceeded, an alarm is activated.

9. The room monitor of claim 1 wherein:

at least one of said at least one message having an associated color.

10. A room monitor comprising:

a controller having at least one input and at least one output, said at least one input being connected to at least one sensor, said at least one output being connected to at least one control device for actuation thereof, said at least one control device changing the at least one room environmental factor, said controller having the functions of monitoring and controlling said at least one room environmental factor of pressure inside a room;

a first display being connected to said controller, said first display providing information for the at least one room environmental factor of pressure inside a room;

at least one second display being connected to said controller, said at least one second display providing at least one message concerning the condition of the room being one of infectious room, room being cleared and room cleared; and entering a command into said controller through said first display to change the pressure inside the room, results of said command being reflected on said at least one second display through a message concerning the condition of the room, said at least one display being located adjacent said first display.

11. The room monitor of claim 10 wherein:

at least one of said at least one message on said second display being active for a programmable period of time.

12. The room monitor of claim 10 wherein:

said controller being accessed to set limits for the at least one room environmental factor, if one of the limits is exceeded, an alarm is activated.

13. The room monitor of claim 10 wherein:

at least one of said at least one message having an associated color.

14. The room monitor of claim 10 wherein:

said first display providing status on a mode of isolation, said status being one of positive isolation, negative isolation or no isolation.

* * * * *